United States Patent
Chen et al.

(10) Patent No.: US 9,684,582 B2
(45) Date of Patent: Jun. 20, 2017

(54) AUTOMATICALLY ANALYZING OPERATION SEQUENCES

(71) Applicant: INTERNATIONAL BUSINESS MACHINES CORPORATION, Armonk, NY (US)

(72) Inventors: Zhuang Chen, Shanghai (CN); Jia Fei, Shanghai (CN); Wei Huang, Shanghai (CN); Tao Kang, Shanghai (CN); Yang Liu, Shanghai (CN); Xiao Wen Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 14/154,440

(22) Filed: Jan. 14, 2014

(65) Prior Publication Data

US 2014/0214837 A1  Jul. 31, 2014

(30) Foreign Application Priority Data

Jan. 29, 2013  (CN) .......................... 2013 1 0034172

(51) Int. Cl.
G06F 17/30 (2006.01)
G06F 11/34 (2006.01)
G06F 11/30 (2006.01)

(52) U.S. Cl.
CPC ...... *G06F 11/3438* (2013.01); *G06F 11/3089* (2013.01); *G06F 11/3003* (2013.01);
(Continued)

(58) Field of Classification Search
CPC ......... G06F 17/30598; G06F 17/30182; G06F 11/0724; G06F 11/079; G06F 11/3003;
(Continued)

(56) References Cited

U.S. PATENT DOCUMENTS 5,821,936 A * 10/1998 Shaffer ............... H04M 1/2477
715/810

2010/0295781 A1  11/2010  Alameh et al.
(Continued)

FOREIGN PATENT DOCUMENTS

CN  101017457  8/2007
CN  101840372  9/2010
(Continued)

OTHER PUBLICATIONS

L. Gupta et al., "Gesture-Based Interaction and Communication: Automated Classification of Hand Gesture Contours", IEEE Transactions on Systems, Man, and Cybernetics—Part C: Applications and Reviews, vol. 31, No. 1, Feb. 2001, pp. 114-120.
(Continued)

*Primary Examiner* — Wei Zhen
*Assistant Examiner* — Mohammed Huda
(74) *Attorney, Agent, or Firm* — Law Office of Jim Boice

(57) ABSTRACT

An automatic analysis method for operation sequence and a system thereof are disclosed. The method comprising: receiving at least one operation sequence containing at least one operation record, the operation record including an operation of switching from a previous user interface to a post user interface, an interval time of switching from the previous user interface to the post user interface; forming time-dependent operation record groups of respective operation sequences based on the interval time and a first time threshold, wherein the time-dependent operation record group includes operation records whose interval time is less than the first time threshold; comparing time-dependent operation record groups of respective operation sequences to obtain identical time-dependent operation record groups; and calculating a frequency that identical time-dependent operation record groups occur in the operation sequence to obtain the identical time-dependent operation record groups having high frequency.

20 Claims, 6 Drawing Sheets

(52) U.S. Cl.
CPC .. *G06F 17/30182* (2013.01); *G06F 17/30598* (2013.01); *G06F 2201/81* (2013.01); *G06F 2201/865* (2013.01)

(58) Field of Classification Search
CPC ............. G06F 11/3089; G06F 11/3409; G06F 11/3452; G06F 2201/81; G06F 2201/865
USPC .......................................... 717/151; 707/737
See application file for complete search history.

(56) References Cited

U.S. PATENT DOCUMENTS

| 2011/0029935 | A1 | 2/2011 | Snyder et al. | |
|---|---|---|---|---|
| 2011/0173199 | A1* | 7/2011 | Heisig | G06F 11/3409 707/737 |
| 2012/0221571 | A1* | 8/2012 | Orman | 707/737 |

FOREIGN PATENT DOCUMENTS

| EP | 2378395 | A2 | 10/2011 |
|---|---|---|---|
| WO | 2006020305 | A1 | 2/2006 |
| WO | 2009035705 | A1 | 3/2009 |
| WO | 2010088156 | A2 | 8/2010 |

OTHER PUBLICATIONS

T. Rehrl et al., "Graphical Models for Real-Time Capable Gesture Recognition", Proceedings of 2010 IEEE 17th International Conference on Image Processing, 2010, pp. 2445-2448.

L. Bretzner et al., "Hand Gesture Recognition Using Multi-Scale Colour Features, Hierarchical Models and Particle Filtering", Proceedings of the Fifth IEEE International Conference on Automatic Face and Gesture Recognition, 2002, pp. 1-6.

T. Ouyang et al., "Bootstrapping Personal Gesture Shortcuts With the Wisdom of the Crowd and Handwriting Recognition", ACM SIGCHI Conference on Human Factors in Computing Science, 2012, pp. 1-10.

* cited by examiner

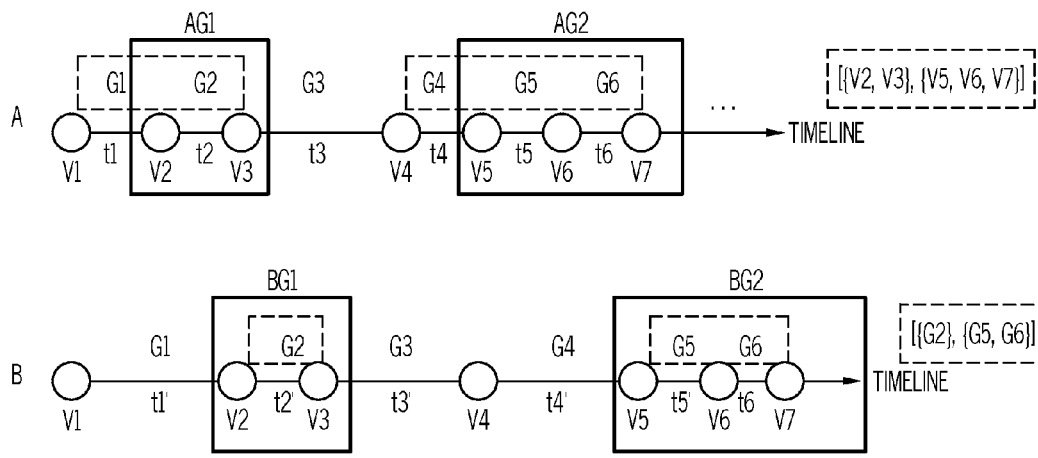
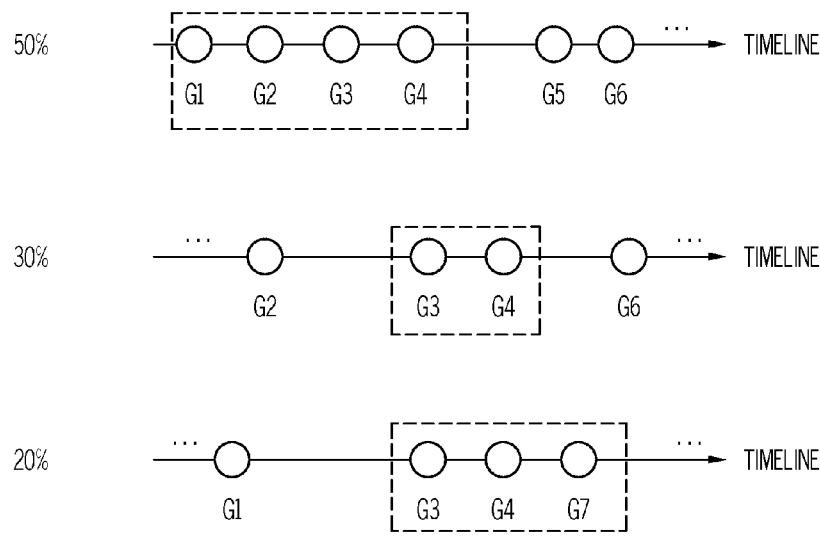
FIG. 3
FIG. 4

US 9,684,582 B2

AUTOMATICALLY ANALYZING OPERATION SEQUENCES

This application is based on and claims the benefit of priority from China (CN) Patent Application 2013-10034172.6, filed on Jan. 29, 2013, and herein incorporated by reference in its entirety.

BACKGROUND

The present invention relates to computer processing method and system for external data, and more specifically, to an automatic analysis method for operation sequence and a system thereof.

Nowadays, as software application pays more and more attention to user's experience, how to improve operation friendliness of a software application becomes increasingly important. Taking the increasingly popular intelligent terminal having a touch screen as an example, existing user operation for testing a software application may employ the following methods.

1. Consumers are invited to try new features of a mobile application, which are observed and recorded by nearby dedicated testers (usually in one-to-one relationship), and a questionnaire for the test is completed after the trial. The shortcoming of this test method lies in that, due to it is essentially a one-to-one test, it is only applicable to a very small number of users, therefore, it is hard to find large number of potential problems.

2. Task based user acceptance test (UAT) method, that is, a group of users accept an invitation to accomplish a series of tasks on a new application, a system makes record based on features of the tasks, and user will generally complete a survey report after finishing the tasks. The shortcoming of this method lies in that, user participating in the test clearly realizes that he/she is completing a series of tests, and is often being disturbed, thus affecting accuracy of the test.

3. User uses a new application under a real scenario, a system records user's access condition, however, whether user has any problem during usage needs to be manually viewed and verified by an administrator. The shortcoming of this method lies in that, a large amount of manual cost is needed to perform check and verification, meanwhile, it is very difficult for manual investigation to find out potential problems at deeper level.

Thus, there is a need for a method and system that is capable of automatically analyzing user operations, so as to be enabled to determine operations on which optimization are possible in relevant software application.

SUMMARY

According to one aspect of the present invention, there is provided an automatic analysis method for operation sequence, comprising: receiving at least one operation sequence containing at least one operation record, the operation record including an operation of switching from a previous user interface to a post user interface, an interval time of switching from the previous user interface to the post user interface; forming time-dependent operation record groups of respective operation sequences based on the interval time and a first time threshold, wherein the time-dependent operation record group includes operation records whose interval time is less than the first time threshold; comparing time-dependent operation record groups of respective operation sequences to obtain identical time-dependent operation record groups; and calculating a frequency that identical time-dependent operation record groups occur in the operation sequence to obtain the identical time-dependent operation record groups having high frequency.

According to another aspect of the present invention, there is provided an automatic analysis system for operation sequence, comprising: an operation sequence receiving means configured for receiving at least one operation sequence containing at least one operation record, the operation record including an operation of switching from a previous user interface to a post user interface, an interval time of switching from the previous user interface to the post user interface; a time-dependent operation record group forming means configured for forming time-dependent operation record groups of respective operation sequences based on the interval time and a first time threshold, wherein the time-dependent operation record group includes operation records whose interval time is less than the first time threshold; a comparing means configured for comparing time-dependent operation record groups of respective operation sequences to obtain identical time-dependent operation record groups; and a frequency calculating means configured for calculating a frequency that identical time-dependent operation record groups occur in the operation sequence to obtain the identical time-dependent operation record groups having high frequency.

The automatic analysis method and system for operation sequence according to the invention may be advantageous to determine operations on which optimization are possible.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 3 shows operation sequences A, B;

FIG. 4 shows distribution of gesture combinations in an identical time-dependent operation record group of operating an intelligent terminal with touch screen;

DETAILED DESCRIPTION

Figure 1:
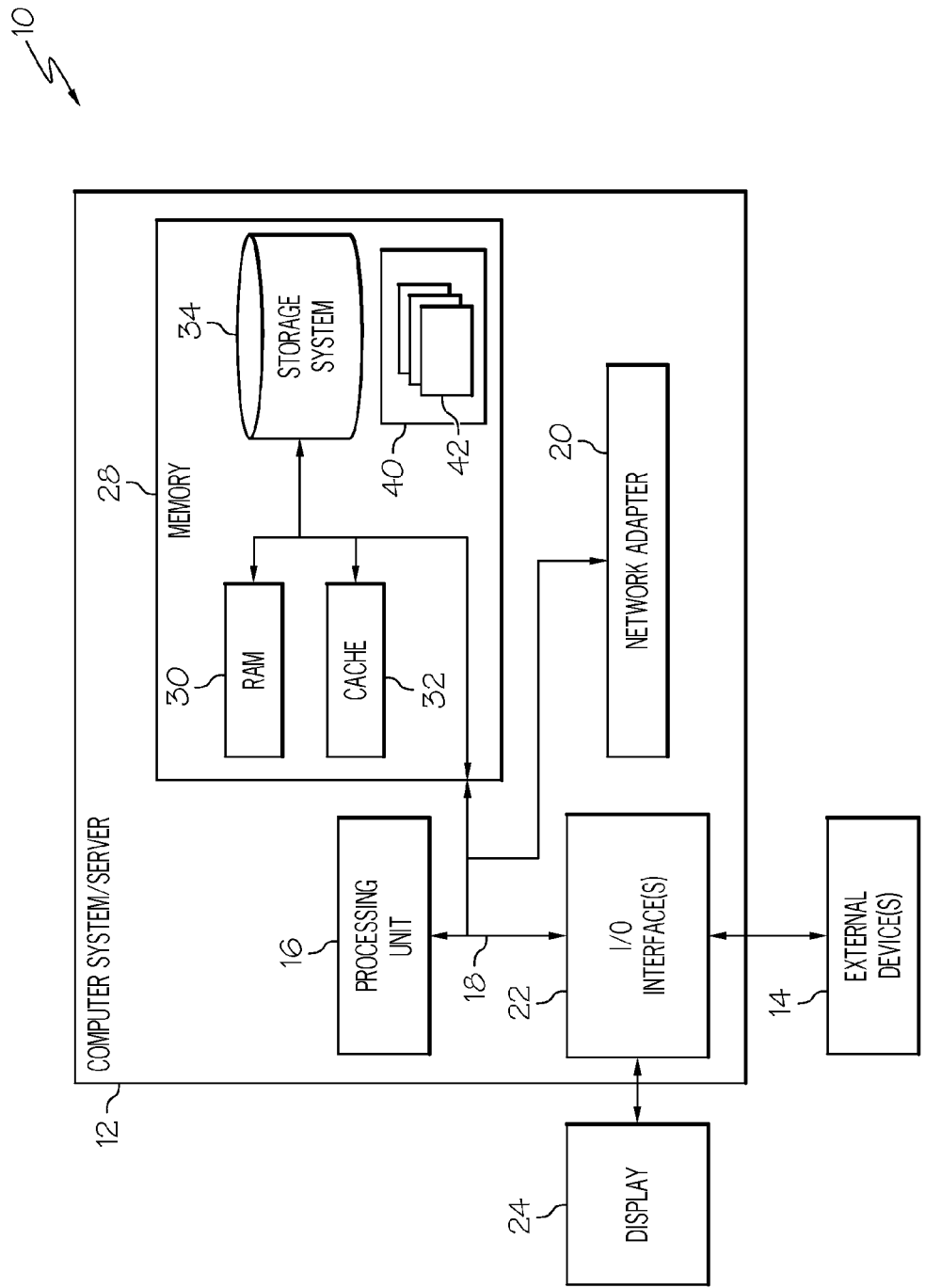
FIG. 1 shows a block diagram of an exemplary computer system/server 12 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
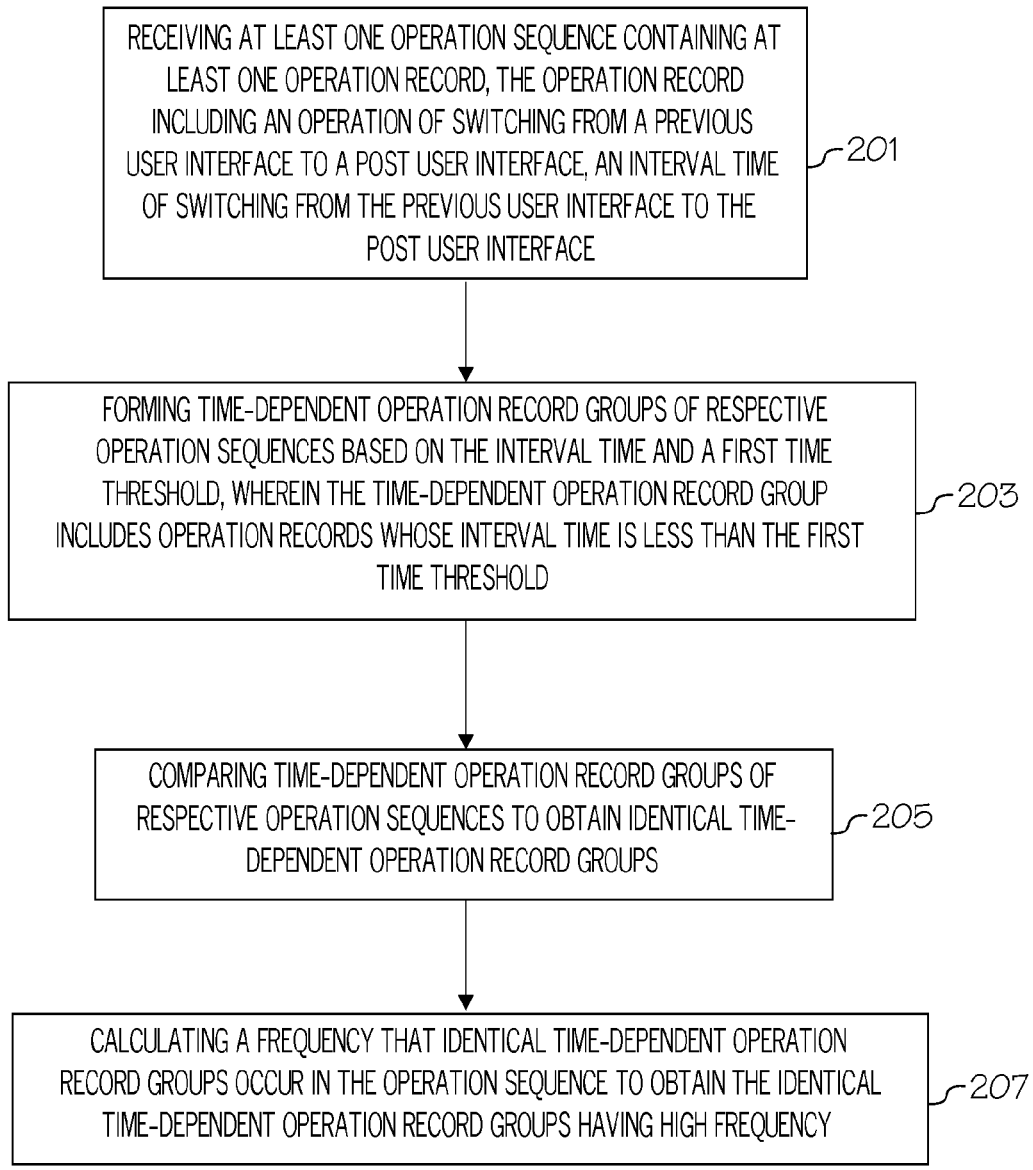
FIG. 2 shows a first embodiment of an automatic analysis method for operation sequence according to the invention.

With reference now to FIG. 2, a first embodiment of a method for an automatic analysis of an operation sequence according to the invention is shown. In step 201, at least one operation sequence containing at least one operation record is received. The operation record includes a record of switching from a previous user interface to a post user interface, an interval time of switching from the previous user interface to the post user interface. Wherein, an operation sequence is a sequence of time-continuous user operations in chronological order from start of a software application to end of the software application, which may be collected from trial of a tester or be collected from user's real usage on the software application. Various existing approaches may be employed to collect user operations, for example, a common collection manner is to monitor start of user operation, record operation track, identify unique operation types by matching with a pattern predetermined by the system, and so on. An operation sequence includes operation records. Within an operation record, there is recorded an operation of switching from a previous user interface to a post user interface per se and an interval time of switching from the previous user interface to the post user interface. Preferably, an operation record may also include a previous user interface, a post user interface. Further, preferably, taking an intelligent terminal with touch screen for example, its operation record may be recorded or/and stored in such a data structure as {$context, $pre-view, $gesture, $post-view, $time}, wherein, $gesture denotes specific operation of a user, such as tap, swipe horizontally etc. $pre-view denotes a previous user interface before that operation. $post-view denotes a post user interface after that operation. Generally, user interface of a software application will have a uniform identifier (ID), and the user interface may be denoted in a record by the ID. $context is used to record information related to $pre-view, $gesture, $post-view etc. If user interface of a software application does not have a uniform identifier (ID), local identification number of these user interfaces may be used along with $context to distinguish respective user interface in different operation records. $time denotes an interval time of switching from a previous user interface to a post user interface. Of course, it will be appreciated by those skilled in the art that, an operation sequence may be represented or stored in various forms such as table, pointer etc., and FIG. 3 shows two different operation sequences of users A and B.

In step 203, forming time-dependent operation record groups of respective operation sequences based on the interval time and a first time threshold, wherein the time-dependent operation record group includes operation records whose interval time is less than the first time threshold. By comparing the interval time of operation records in respective operation sequence to the first time threshold, operation records whose interval time is less than the first time threshold are classified into one time-dependent operation record group. There may be a plurality of different time-dependent operation record groups within one operation sequence, and a time-dependent operation record group may have only one operation record or may have a plurality of operation records. Preferably, in case that there are a plurality of operation records in the time-dependent operation record group, any two adjacent operation records in that plurality of operation records are operation records formed by two time-adjacent operations. Wherein, the first time threshold is used to measure user's operation time during a previous user interface and a post user interface, and may be set by those skilled in the art based on practical experience, for example, the first time threshold may be set to 1 second etc. If interval times of two adjacent gestures are both less than the first time threshold, it means that the two adjacent gestures occur successively within a sufficiently short period of time. Further, if that gesture combination occurs frequently in same scenario of different users, it means that optimization is possible on that gesture combination. Any two adjacent operation records of that plurality of operation records are operation records formed by two operations immediately adjacent in time. On basis of the present application, those skilled in the art can contemplate various methods to parse out, from an operation sequence, time-dependent operation record group in that operation sequence, which will be described hereinafter through a plurality of preferred embodiments.

In step 205, comparing time-dependent operation record groups of respective operation sequences to obtain identical time-dependent operation record groups. Wherein, in step 203, corresponding time-dependent operation record groups are generated for respective operation sequences, thus time-dependent operation record groups in respective operation sequences may be compared with time-dependent operation record groups in other operation sequences one by one, so as to find corresponding time-dependent operation record groups in other operation sequences identical to those groups, preferably, information such as identical time-dependent operation record group, operation sequence occurred etc are recorded. Identical time-dependent operation record group means that operation records in these time-dependent operation record groups and data in the operation records are identical or similar. For example, if what is recorded in an operation record is operation and corresponding interval time, then it may be required that the operations are identical or at least types thereof are identical (e.g., all the operations are double tap) or similar (e.g., swipe or flicker). Whereas, interval times are all required to be less than a threshold, e.g., the above first time threshold, or a more strict time threshold may be employed, which can be adjusted by those skilled in the art as needed. Wherein, the operation record may further include a previous user interface and a post user interface, then identical time-dependent operation record group further includes that, all the previous user interfaces and the post user interfaces in corresponding respective operation records of time-dependent operation record groups are identical, and types of the operations are identical or similar. If user interface ID is used to record user interface, then all the previous user interfaces and the post user interfaces are identical means that, all the previous user interface IDs and the post user interface IDs in corresponding respective operation records of time-dependent operation record groups are required to be identical. FIG. 3 shows corresponding identical time-dependent operation record groups found in operation sequences A, B: that is, AG1-BG1, AG2-BG2, their corresponding operations (gestures) are {G2}, {G5, G6} respectively, and corresponding user interfaces are {V2, V3}, {V5, V6, V7}, wherein t1, t2, t6, . . . , t1', t2', . . . , t6' are interval times. The above identical time-dependent operation record groups use a manner that operations and corresponding interfaces are recorded in separate groups, of course, those skilled in the art may use various manners to record identical time-dependent operation record groups.

In step 207, calculating a frequency that identical time-dependent operation record groups occur in the operation sequence to obtain the identical time-dependent operation record groups having high frequency. Based on the identical time-dependent operation record groups obtained in step 205, preferably, in response to time-dependent operation record group of one operation sequence including all the operation records in time-dependent operation record group of another operation sequence, determining that the time-dependent operation record group of the another operation sequence also occurs in said one operation sequence. Preferably, counting total number of times that the identical time-dependent operation record group occurs in respective operation sequence, and dividing the total number of times by total number of operation sequences to obtain a frequency that the identical time-dependent operation record group occurs in the operation sequences. Sometimes, one time-dependent operation record group may occur in a same operation sequence multiple times, thus it may be considered to be counted as multiple times, or be counted as only once to facilitate calculation of occurrence frequency. Of course, those skilled in the art may contemplate various frequency calculation methods based on actual needs, and description of which will be omitted here. Preferably, ordering identical time-dependent operation record groups based on frequency that the identical time-dependent operation record group occurs in operation sequence, and recommending the identical time-dependent operation record group having high frequency to improve operation relevant to that time-dependent operation record group.

FIG. 4 shows distribution of gesture combinations in an identical time-dependent operation record group of operating an intelligent terminal with touch screen, wherein, gesture combination {G1, G2, G3, G4} has occurred in 50% of operation sequences, gesture combination {G3, G4} has occurred in 30% of operation sequences, gesture combination {G3, G4, G7} has occurred in 20% of operation sequences. Since gesture combination {G3, G4} has been included in gesture combination {G1, G2, G3, G4} and gesture combination {G3, G4, G7}, a frequency that gesture combination {G3, G4} occurs in operation sequences is 100% (=50%+30%+20%). If the above gesture combinations are ordered according to frequency that they occur in gesture sequences from high to low, the obtained order is: {G3, G4}, 100%; {G1, G2, G3, G4}, 50%; {G3, G4, G7}, 20%. Thus, gesture combination {G3, G4} may be recommended for optimization, for example, gesture combination {G3, G4} is directly replaced with a gesture G', then user time may be significantly saved and user experience is improved.

Figure 5:
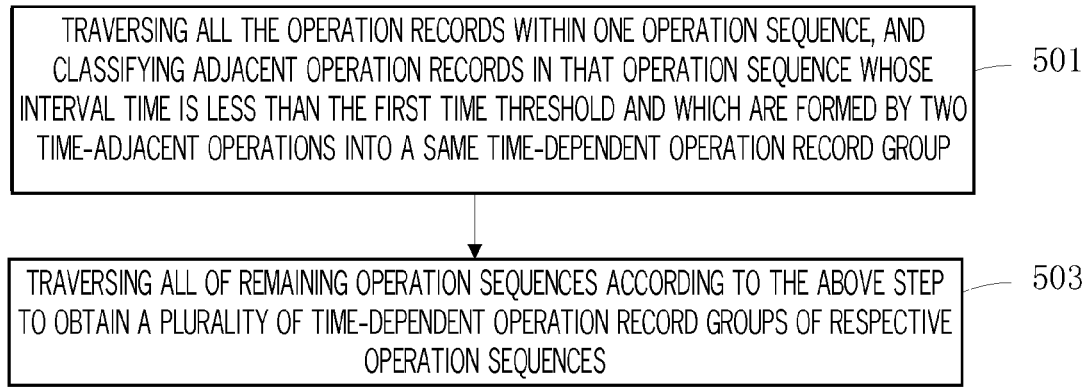
FIG. 5 shows an embodiment of analyzing, from an operation sequence, time-dependent operation record groups in that operation sequence.

FIG. 5 shows an embodiment of analyzing, from an operation sequence, time-dependent operation record groups in that operation sequence. In step 501, traversing all the operation records within one operation sequence, and classifying adjacent operation records in that operation sequence whose interval time is less than the first time threshold and which are formed by two time-adjacent operations into a same time-dependent operation record group. One time-dependent operation record group may include only one operation record (because a next operation record adjacent to that operation record may not satisfy requirement of the first time threshold), since there may be a plurality of operation record groups whose interval times are less than the first time threshold and which are formed by operations continuous in time, there may be a plurality of operation records. In step 503, traversing all of the remaining operation sequences according to the method of step 501 to obtain a plurality of time-dependent operation record groups of respective operation sequences. Preferably, further comparing, before traversing all the operation records within one operation sequence, the interval time in operation records of that operation sequence to a second time threshold, and excluding the operation record whose interval time is larger than or equal to the second time threshold from all the time-dependent operation record groups. Being larger than or equal to the second time threshold may be used to characterize that user stays in an interface for a long time and does not perform any operation. The second time threshold may be set by those skilled in the art as needed, for example, it may be set to 3 minutes. The advantage of doing so is that inappropriate operation records may be excluded in advance and parallel calculation may be utilized to accelerate obtaining time-dependent operation record groups of respective operation sequences.

Figure 6:
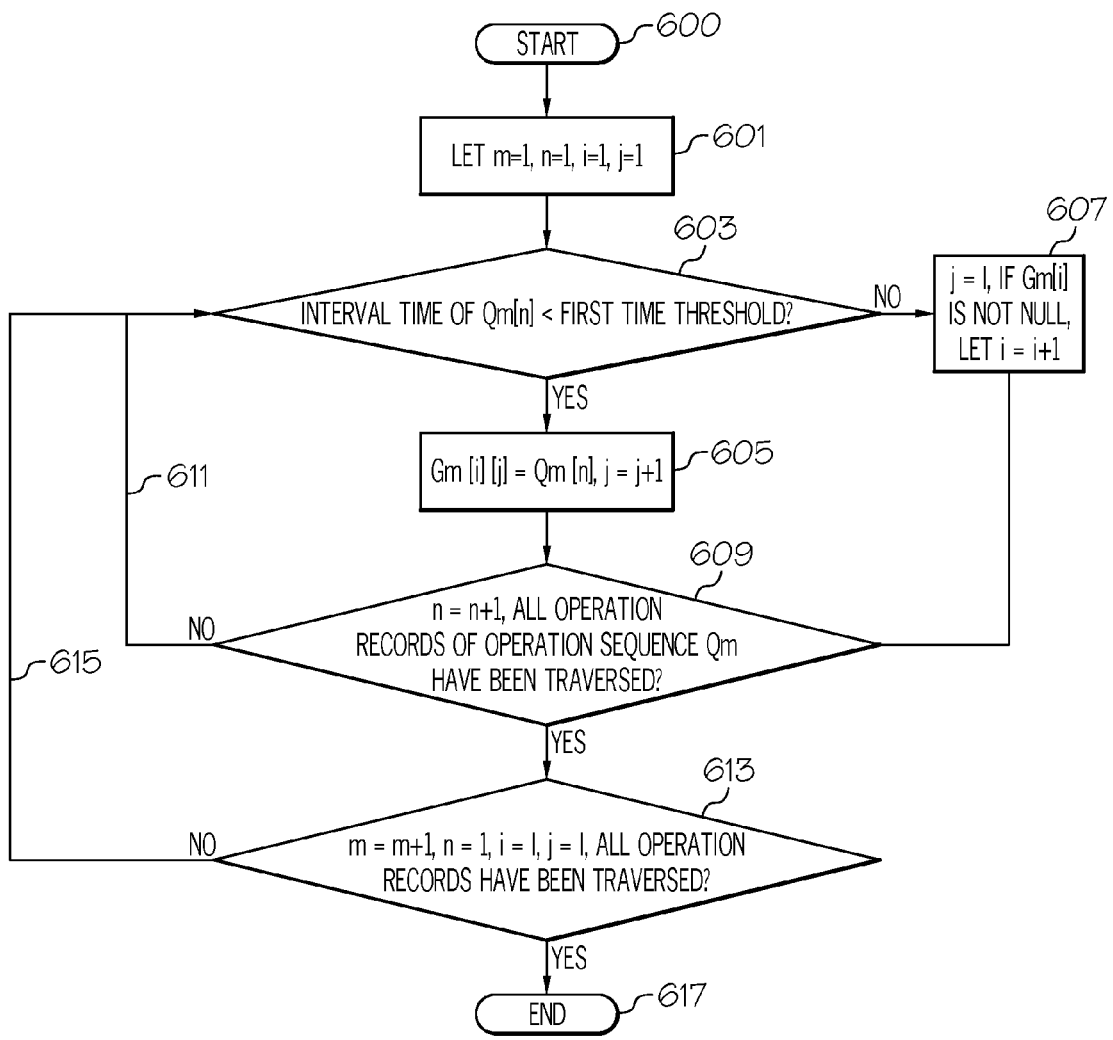
FIG. 6 shows another embodiment of analyzing, from respective operation sequence, time-dependent operation record groups in that operation sequence.

FIG. 6 shows another embodiment of analyzing, from respective operation sequence, time-dependent operation record groups in that operation sequence. Preferably, operation record in respective operation sequences is represented in form of $Q_m[n]$, wherein m, n are natural number, m represents operation sequence number, n represents operation record number in that operation sequence, for example, $Q_1[1]$ represents first operation record of operation sequence 1. The time-dependent operation record group is represented as $G_m[i]$, wherein i is a natural number, for example, $G_1[1]$ represents first time-dependent operation record group of operation sequence 1. Of course, the definition may be continued, $G_m[i][j]$ is used to represent $j^{-th}$ operation record in time-dependent operation record group $G_m[i]$, wherein j is a natural number. In step 600, the flow starts: in step 601, let m=1, n=1, i=1, j=1; in step 603, compare interval time of operation record $Q_m[n]$ in operation sequence to a first time threshold; in step 605, in response to the interval time being less than the first time threshold, let $G_m[i][j]=Q_m[n]$, j=j+1; in step 607, in response to the interval time being larger than or equal to the first time threshold, let j=1, if $G_m[i]$ is not null, let i=i+1; in step 609, let n=n+1, decide whether all the operation records of the operation sequence $Q_m$ have been traversed; in step 611, in response to all the operation records of the operation sequence $Q_m$ have not been traversed, repeat steps 603 to 609; in step 613, in response to operation sequence $Q_m$ has been traversed, let m=m+1, n=1, i=1, j=1, and decide whether all the operation sequences have been traversed; in step 615, in response to all the operation sequences have not been traversed, repeat steps 603 to 613; in step 617, in response to all the operation sequences have been traversed, the flow ends. With this embodiment, time-dependent operation record groups in respective operation sequences may be obtained by automatic analysis, and it may be ensured that these time-dependent operation record groups record, as long as possible, user's successive operations within a short period of time, such that it is more advantageous to find potential operation combinations on which optimization are possible.

The method shown in FIG. 6 is to sequentially analyze respective operation records of an operation sequence one by one to form a time-dependent operation record group, and then form a next time-dependent operation record group. However, those skilled in the art may also first traverse an operation sequence to find all operation records whose interval time is less than a first time threshold. Since an operation record may record information of its adjacent operation records, successive operation records in all the operation records whose interval times are less than the first time threshold may be clustered together, thereby forming respective time-dependent operation record groups. In sum, on basis of the present application, those skilled in the art may contemplate various embodiments of forming time-dependent operation record groups of respective operation sequences based on the interval time and a first time threshold.

Figure 7:
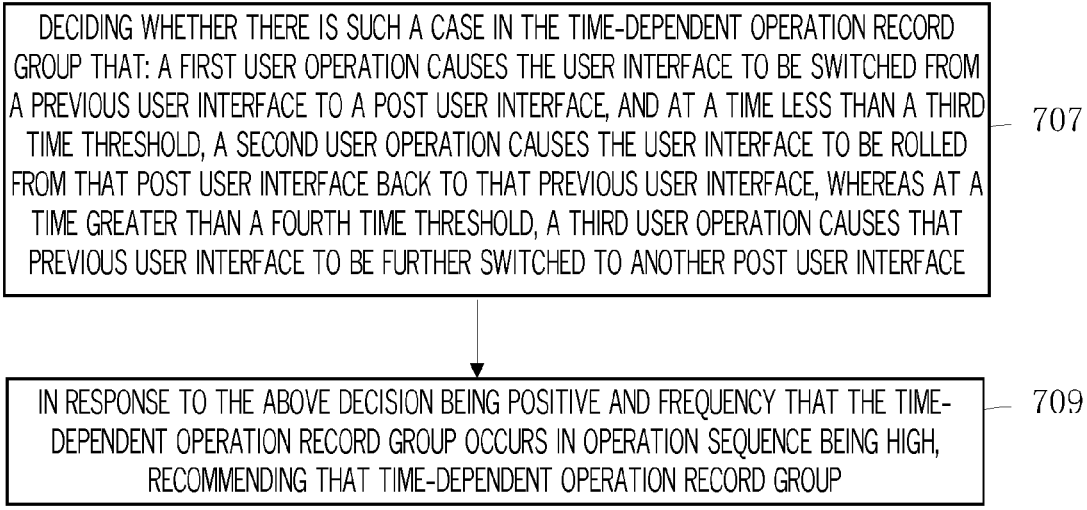
FIG. 7 shows another embodiment of an automatic analysis method for operation sequence according to the invention.

FIG. 7 shows another embodiment of an automatic analysis method for operation sequence according to the invention. In practical operation, there may be a scenario that some operations occur in a very short period of time and result in an interface's exact rollback, which may be originated from an erroneous operation (design). The method provided by FIG. 7 is just for finding such scenario. Wherein, in step 701, deciding whether there is such a case in the time-dependent operation record group that: a first user operation causes the user interface to be switched from a previous user interface to a post user interface, and at a time less than a third time threshold, a second user operation causes the user interface to be rolled from that post user interface back to that previous user interface, whereas at a time greater than a fourth time threshold, a third user operation causes that previous user interface to be further switched to another post user interface; in step 703, in response to the above decision being positive and frequency that the time-dependent operation record group occurs in operation sequence being high, recommending that time-dependent operation record group. An operation designer may optimize these operations which might have potential problems. Wherein, both of the third time threshold and the fourth time threshold may be set by those skilled in the art as needed or according to their practical experience, which will be omitted here for brevity.

Figure 8:
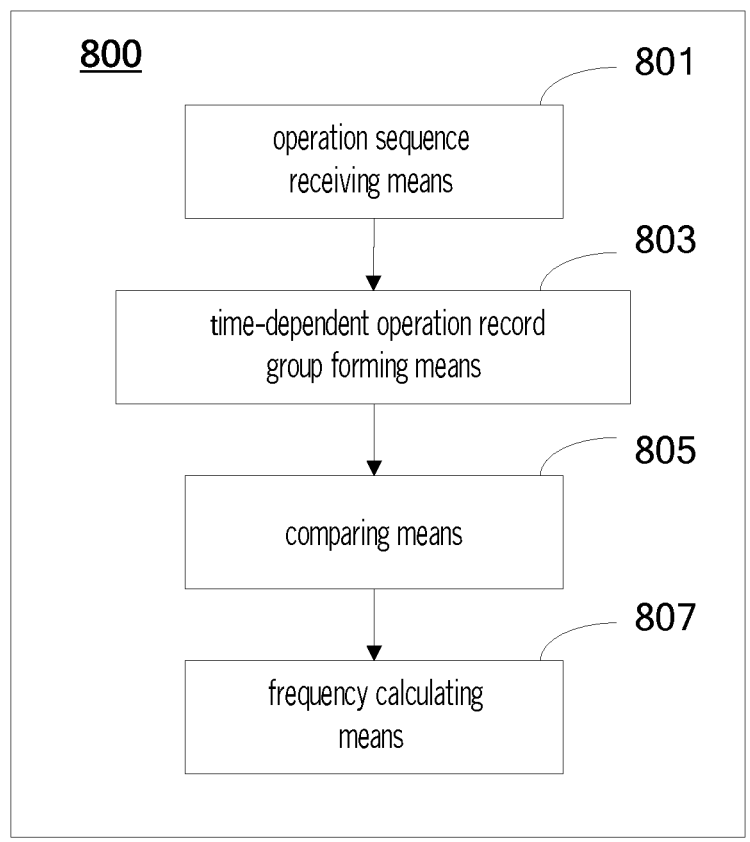
FIG. 8 shows an automatic analysis system for operation sequence.

FIG. 8 shows an automatic analysis system 800 for operation sequence. The automatic analysis system 800 comprises: an operation sequence receiving means 801 configured for receiving at least one operation sequence containing at least one operation record, the operation record including an operation of switching from a previous user interface to a post user interface, an interval time of switching from the previous user interface to the post user interface; a time-dependent operation record group forming means 803 configured for forming time-dependent operation record groups of respective operation sequences based on the interval time and a first time threshold, wherein the time-dependent operation record group includes operation records whose interval time is less than the first time threshold; a comparing means 805 configured for comparing time-dependent operation record groups of respective operation sequences to obtain identical time-dependent operation record groups; and a frequency calculating means 807 configured for calculating a frequency that identical time-dependent operation record groups occur in the operation sequence to obtain the identical time-dependent operation record groups having high frequency. Detailed implementation of the above various means have been described hereinabove in detail, the description of which will be here for brevity.

Preferably, the time-dependent operation record group forming means 803 comprises: a classifying means configured for traversing all the operation records within one operation sequence, and classifying adjacent operation records in that operation sequence whose interval time is less than the first time threshold and which are formed by two time-adjacent operations into a same time-dependent operation record group.

Preferably, the time-dependent operation record group forming means 803 further comprises: an excluding means configured for comparing, before traversing all the operation records within one operation sequence, the interval time in operation records of that operation sequence to a second time threshold, and excluding the operation record whose interval time is larger than or equal to the second time threshold from all the time-dependent operation record groups.

Preferably, the frequency calculating means 807 comprises: a determining means configured for, in response to time-dependent operation record group of one operation sequence including all the operation records in time-dependent operation record group of another operation sequence, determining that the time-dependent operation record group of the another operation sequence also occurs in said one operation sequence.

Preferably, the frequency calculating means 807 further comprises: a counting means configured for counting total number of times that the identical time-dependent operation record group occurs in respective operation sequence, and dividing the total number of times by total number of operation sequences to obtain a frequency that the identical time-dependent operation record group occurs in the operation sequences.

Preferably, the frequency calculating means 807 comprises: an ordering means configured for ordering identical time-dependent operation record groups based on frequency that the identical time-dependent operation record group occurs in operation sequence; and a first recommending means configured for recommending the identical time-dependent operation record group having high frequency.

Preferably, wherein the operation record further comprises a previous user interface and a post user interface.

Preferably, wherein the identical time-dependent operation record group refers to that the previous user interface, the post user interface and type of the operation within respective operation record of a time-dependent operation record group are all identical.

Preferably, the automatic analysis system 800 further comprises: a deciding means configured for deciding whether there is such a case in the time-dependent operation record group that: a first user operation causes the user interface to be switched from a previous user interface to a post user interface, and at a time less than a third time threshold, a second user operation causes the user interface to be rolled from that post user interface back to that previous user interface, whereas at a time greater than a fourth time threshold, a third user operation causes that previous user interface to be further switched to another post user interface; and a second recommending means configured for, in response to the above decision being positive and frequency that the time-dependent operation record group occurs in operation sequence being high, recommending that time-dependent operation record group.

Preferably, wherein, if there is a plurality of operation records in the time-dependent operation record group, any two adjacent operation records in that plurality of operation records are operation records formed by two time-adjacent operations.

Preferably, wherein the user operation is the user operation for a touch screen.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of automatically analyzing and optimizing sequences of operations on user interfaces, the method comprising:

measuring, by one or more processors, a time interval value of a time elapsed during a process of switching from a first user interface to a second user interface and from the second user interface to a third user interface during a first operation sequence, wherein a first user interface gesture causes the process to switch from the first user interface to the second user interface, and wherein a second user interface gesture causes the process to switch from the second user interface to the third user interface;

forming, by one or more processors, time-dependent operation record groups of respective operation sequences based on the time interval value and a first time threshold, wherein the time-dependent operation record groups include group includes operation records whose respective time interval values are less than the first time threshold;

comparing, by one or more processors, the time-dependent operation record groups of respective operation sequences to obtain identical time-dependent operation record groups that utilize the first user interface gesture and the second user interface gesture;

identifying, by one or more processors, the identical time-dependent operation record groups that occur more frequently than a predetermined level;

combining, by one or more processors, the first user interface gesture and the second user interface gesture into a third user interface gesture to be used in the identified identical time-dependent operation record groups that occur more frequently than the predetermined level;

receiving user input corresponding to the third user interface gesture; and responsive to receipt of the user input, performing functions that would be performed in response to receipt of user input corresponding to both of the first user interface gesture and the second user interface gesture.

2. The method according to claim 1, wherein said forming the time-dependent operation record groups of respective operation sequences based on the time interval values and the first time threshold comprises:

traversing all operation records within the first operation sequence; and classifying adjacent operation records, from the first operation sequence, whose time interval is less than the first time threshold and which are formed by two time-adjacent operations into a same time-dependent operation record group.

3. The method according to claim 2, wherein said forming the time-dependent operation record groups of respective operation sequences based on the time interval values and the first time threshold further comprises:

comparing, before traversing all the operation records within the first operation sequence, the time interval in operation records of the first operation sequence to a second time threshold; and excluding any operation record whose time interval is larger than or equal to the second time threshold from all time-dependent operation record groups.

4. The method according to claim 2, wherein said identifying the identical time-dependent operation record groups that occur more frequently than the predetermined level comprises:
calculating, by one or more processors, a frequency that the identical time-dependent operation record groups occur in the first operation sequence; and
in response to a time-dependent operation record group of the first operation sequence including all operation records in a time-dependent operation record group of a second operation sequence, determining that the time-dependent operation record group of the second operation sequence also occurs in said first operation sequence.

5. The method according to claim 1, wherein said identifying the identical time-dependent operation record groups that occur more frequently than the predetermined level further comprises:
calculating, by one or more processors, a frequency that the identical time-dependent operation record groups occur in the first operation sequence;
counting a total number of times that the identical time-dependent operation record groups occur in respective operation sequences; and
dividing the total number of times that the identical time-dependent operation record groups occur in respective operation sequences by a total number of operation sequences to obtain a frequency that the identical time-dependent operation record groups occur in the operation sequences.

6. The method according to claim 1, wherein said identifying the identical time-dependent operation record groups that occur more frequently than the predetermined level further comprises:
calculating, by one or more processors, a frequency that the identical time-dependent operation record groups occur in the first operation sequence;
ordering the identical time-dependent operation record groups based on a frequency that the identical time-dependent operation record groups occur in said at least one operation sequence; and
recommending an identical time-dependent operation record group that occurs more frequently than a predetermined level be implemented in future applications.

7. The method according to claim 1, wherein the operation record further comprises a description of the first user interface and the second user interface.

8. The method according to claim 2, wherein all operation records within the identical time-dependent operation record groups contain records of identical first user interfaces, second user interfaces, and types of operations.

9. The method according to claim 3, further comprising:
determining whether there is such a case in the time-dependent operation record group that:
a first user operation causes a user interface on a display to be switched from the first user interface to the second user interface in less time than a third time threshold;
a second user operation causes the user interface to be rolled from the second user interface back to the first user interface at a time greater than a fourth time threshold; and
a third user operation causes the first user interface to be further switched to the second user interface; and
in response to the case exists and that a frequency of the time-dependent operation record group occurs in the first operation sequence more frequently than a predetermined level, implementing the time-dependent operation record group in future applications.

10. The method according to claim 1, further comprising:
identifying two adjacent operation records in the time-dependent operation record group; and
determining that said identified two adjacent operation records in the time-dependent record group are formed by two time-adjacent operations.

11. A system for automatically analyzing operation sequences on user interfaces, the system comprising:
hardware sequence receiving means for receiving at least one operation sequence containing at least one operation record, wherein the operation record includes a record of switching from a first user interface to a second user interface in response to a first user interface gesture, wherein the operation record includes a record of switching from the second user interface to a third user interface in response to a second user interface gesture, and wherein the operation record comprises a record of a time interval required to switch from the first user interface to the third user interface in response to the first user interface gesture and the second user interface gesture being executed;
hardware record group forming means for forming time-dependent operation record groups of respective operation sequences based on the time interval and a first time threshold, wherein the time-dependent operation record group includes operation records whose time interval is less than the first time threshold;
hardware comparing means for comparing time-dependent operation record groups of respective operation sequences to obtain identical time-dependent operation record groups that utilize the first user interface gesture and the second user interface gesture;
hardware identifying means for identifying identical time-dependent operation record groups that occur more frequently than a predetermined level, and
one or more processors for combining the first user interface gesture and the second user interface gesture into a third user interface gesture to be used in the identified identical time-dependent operation record groups that occur more frequently than the predetermined level;
receiving user input corresponding to the third user interface gesture; and
responsive to receipt of the user input, performing functions that would be performed in response to receipt of user input corresponding to both of the first user interface gesture and the second user interface gesture.

12. The system according to claim 11, wherein said hardware record group forming means comprises:
hardware traversing means for traversing all operation records within a first operation sequence; and
hardware classifying means for classifying adjacent operation records, from the first operation sequence, whose time interval is less than the first time threshold and which are formed by two time-adjacent operations into a same time-dependent operation record group.

13. The system according to claim 12, wherein said hardware record group forming means further comprises:
hardware time interval comparing means for comparing, before traversing all the operation records within the first operation sequence, the time interval in operation records of the first operation sequence to a second time threshold; and hardware excluding means for excluding any operation record whose time interval is larger than or equal to the second time threshold from all time-dependent operation record groups.

14. The system according to claim 12, further comprising:
hardware calculating means for calculating a frequency that identical time-dependent operation record groups occur in the operation sequence; and
hardware sequence occurrence determining means for, in response to a time-dependent operation record group of the first operation sequence including all operation records in a time-dependent operation record group of a second operation sequence, determining that the time-dependent operation record group of the second operation sequence also occurs in said first operation sequence.

15. The system according to claim 11, further comprising:
hardware calculating means for calculating a frequency that identical time-dependent operation record groups occur in the operation sequence;
hardware counting means for counting a total number of times that the identical time-dependent operation record groups occur in respective operation sequences; and
hardware dividing means for dividing the total number of times that the identical time-dependent operation record groups occur in respective operation sequences by a total number of operation sequences to obtain a frequency that the identical time-dependent operation record groups occur in the operation sequences.

16. A computer program product for automatically analyzing sequences of operations on user interfaces, the computer program product comprising a computer readable storage medium having program code embodied therewith, the program code readable and executable by a processor to perform a method comprising:
measuring a time interval value of a time elapsed during a process of switching from a first user interface to a second user interface and from the second user interface to a third user interface during a first operation sequence, wherein a first user interface gesture causes the process to switch from the first user interface to the second user interface, and wherein a second user interface gesture causes the process to switch from the second user interface to the third user interface;
forming time-dependent operation record groups of respective operation sequences based on the time interval and a first time threshold, wherein the time-dependent operation record group includes operation records whose time interval is less than the first time threshold;
comparing time-dependent operation record groups of respective operation sequences to obtain identical time-dependent operation record groups that utilize the first user interface gesture and the second user interface gesture;
identifying identical time-dependent operation record groups that occur more frequently than a predetermined level;
combining the first user interface gesture and the second user interface gesture into a third user interface gesture to be used in the identified identical time-dependent operation record groups that occur more frequently than the predetermined level;
receiving user input corresponding to the third user interface gesture; and
responsive to receipt of the user input, performing functions that would be performed in response to receipt of user input corresponding to both of the first user interface gesture and the second user interface gesture.

17. The computer program product according to claim 16, wherein said forming time-dependent operation record groups of respective operation sequences based on the time interval and a first time threshold comprises:
traversing all operation records within a first operation sequence; and
classifying adjacent operation records, from the first operation sequence, whose time interval is less than the first time threshold and which are formed by two time-adjacent operations into a same time-dependent operation record group.

18. The computer program product according to claim 17, wherein said forming time-dependent operation record groups of respective operation sequences based on the time interval and a first time threshold further comprises:
comparing, before traversing all the operation records within the first operation sequence, the time interval in operation records of the first operation sequence to a second time threshold; and
excluding any operation record whose time interval is larger than or equal to the second time threshold from all time-dependent operation record groups.

19. The computer program product according to claim 17, wherein said identifying the identical time-dependent operation record groups that occur more frequently than the predetermined level comprises:
calculating a frequency that identical time-dependent operation record groups occur in the operation sequence; and
in response to a time-dependent operation record group of the first operation sequence including all operation records in a time-dependent operation record group of a second operation sequence, determining that the time-dependent operation record group of the second operation sequence also occurs in said first operation sequence.

20. The computer program product according to claim 16, wherein said identifying the identical time-dependent operation record groups that occur more frequently than the predetermined level further comprises:
calculating a frequency that the identical time-dependent operation record groups occur in the operation sequence;
counting a total number of times that the identical time-dependent operation record groups occur in respective operation sequences; and
dividing the total number of times that the identical time-dependent operation record groups occur in respective operation sequences by a total number of operation sequences to obtain a frequency that the identical time-dependent operation record groups occur in the operation sequences.

* * * * *